United States Patent [19]

Lubchenko et al.

[11] Patent Number: 4,496,986
[45] Date of Patent: Jan. 29, 1985

[54] SUBSCRIPTION TELEVISION INTERFACE

[75] Inventors: Eugene Lubchenko; Leander H. Hoke, Jr., both of Knoxville; Richard J. Burton, Morristown, all of Tenn.

[73] Assignee: U.S. Philips Corporation, New York, N.Y.

[21] Appl. No.: 457,308

[22] Filed: Jan. 11, 1983

[51] Int. Cl.³ .............................................. H04N 7/16
[52] U.S. Cl. ..................................... 358/114; 358/118
[58] Field of Search ............. 358/114, 118, 123, 191.1

[56] References Cited

U.S. PATENT DOCUMENTS 4,398,214  8/1983  Gargini ................................ 358/118

Primary Examiner—Richard Murray
Assistant Examiner—Victor R. Kostak
Attorney, Agent, or Firm—Thomas A. Briody; William J. Streeter; Charles E. Quarton

[57] ABSTRACT

An interface for subscription television reception which restores the program selection function to the tuner of the television receiver. This is of particular importance to subscribers using remote control receivers. Subscription television signals are split into two substantially identical components, one of which is fed to the tuner of the television receiver and the other of which is passed through a band reject filter to an adder. The intermediate frequency output of the tuner is converted to a predetermined carrier frequency in the television broadcast band and, as so converted, fed to the other input of the adder. The output of the adder is, in turn, fed to a conventional subscription television converter/decoder, which is set to select the program on the predetermined carrier frequency and decode the same. The converter/decoder output is converted to the intermediate frequency carrier for amplification and further processing in the intermediate frequency circuitry of the television receiver.

8 Claims, 3 Drawing Figures

SUBSCRIPTION TELEVISION INTERFACE

The present invention relates to subscription television reception and particularly relates to an interface which restores the program selection function to the tuner of the television receiver.

In subscription or "pay" television systems, the system operator furnishes each subscriber with a converter/decoder which "unscrambles" encoded programs and enables the subscriber to select the program desired. The selected program is converted to a perdetermined channel in the television broadcast band. Thus, the tuner of the television receiver remains fixed at the predetermined output channel of the converter/decoder. Where the television receiver is equipped for remote channel selection, this feature is thereby rendered useless to the subscriber.

In accordance with the present invention, the incoming subscription television programming is split, the first half being fed to the television receiver tuner input. The subscriber tunes the desired program in the usual manner, the tuner converting the selected program to an intermediate frequency carrier. The intermediate frequency signal, after conversion to a second predetermined channel in the television broadcast band, is combined with the second half of the split signal. In order to preclude the possibility of interface with signals originally transmitted on the second predetermined channel, a band rejection filter may be interposed between the second output of the signal splitter and the adder.

The composite signal produced at the output of the adder is fed to the converter/decoder, which is set to the second predetermined channel. Thus, the converter/decoder passes only the program selected by the tuner, converting the same to the first predetermined channel. The interface then converts the converter/decoder output back to the intermediate frequency for amplification and further processing by conventional television circuitry. Preferably, the first and second predetermined channels are identical.

Since the signal path from the signal splitter through the tuner passes the program selected by the subscriber, where information needed for decoding the program is carried on the same channel, this path passes the decoding information as well. However, subscribers may be served by subscription television companies which transmit decoding information on a channel separated from the program channel. This information is, of necessity, lost in the tuner circuitry. Unless this decoding information is available to the converter/decoder, the selected program will remain scrambled, hence unusable to the subscriber. For that reason the other signal path is available to carry this information on its original channel to the converter/decoder.

The present invention may best be understood by reference to the following detailed description when considered in conjunction with the drawings in which.

Figure 1:
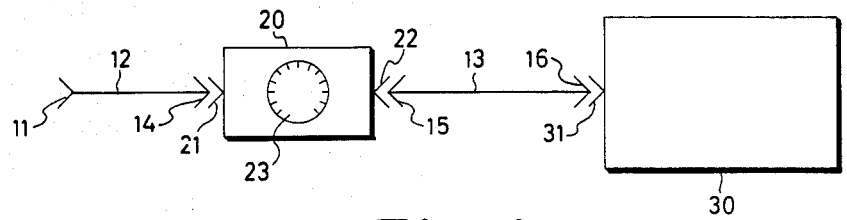
FIG. 1 depicts a conventional arrangement for subscription television reception.

Referring now to the drawings in which reference numerals designate like or corresponding elements throughout the several views, there is shown in FIG. 1 a conventional arrangement for subscription or "pay" television reception, consisting of a cable drop 11 to be connected to a broadband signal source, a converter-decoder 20, and a television receiver 30, together with connecting coaxial cables 12 and 13. Converter/decoder 20 is equipped with connectors 14 and 15, respectively, terminating coaxial cables 12 and 13. Similarly, television receiver 30 is equipped with a connector 31 which mates with the terminating connector 16 of coaxial cable 13. Connector 31 in turn, feeds the tuner (not shown) inside television receiver 30. Connectors 14, 15, 16, 21, 22, and 31 facilitate releaseable interconnection of cable drop 11, converter/decoder 20, and television receiver 30.

The signal fed to cable drop 11 comprises a plurality of different programs, each carried at a different frequency or "channel" of the radio frequency spectrum. The source of these signals may be, for example, a cable network buried under ground or strung on utility poles, or microwave receiver for ground-based or satellite broadcast stations. The cablecaster or broadcaster originating the signal charges subscribers a fee for viewing available programs on a periodic or individual program basis, or a combination of the two. Accordingly, the signal may be encoded or "scrambled" to deter reception by viewers who have not paid for the same. Converter/decoder 20, typically furnished by the originating cablecaster or broadcaster, essentially functions, from the subscriber's standpoint, in the same manner as a conventional television tuner, enabling the subscriber to select the desired programming through a rotary dial or other conventional selection device 23. Converter/decoder converts the carrier frequency of the selected program to a preset channel within the bands assigned for television broadcast, usually to channel 2, 3, or 4. In addition, where the source signals are to be scrambled, converter/decoder 20 includes circuitry to decode or "unscramble" the programming for authorized viewers. Converter/decoder 20 thus performs three functions (1) selection of programming by the subscriber, (2) conversion of the selected programming to a single channel to which the television receiver may be tuned, and (3) decoding scrambled programs.

It can thus be seen that the subscriber will use selection device 23 of the converter/decoder 20 to select programming, rather than the tuner control (not shown) of television receiver 30, which will remain tuned to the present output channel of converter/decoder 20. While this arrangement presents no inconvenience to many viewers, those subscribers who have purchased television receivers equipped with remote control tuning will be unable to use that feature of the receiver. The instant invention overcomes this problem, permitting remote selection of subscription programming without interfering with the unscrambling of encoded programming.

Figure 2:
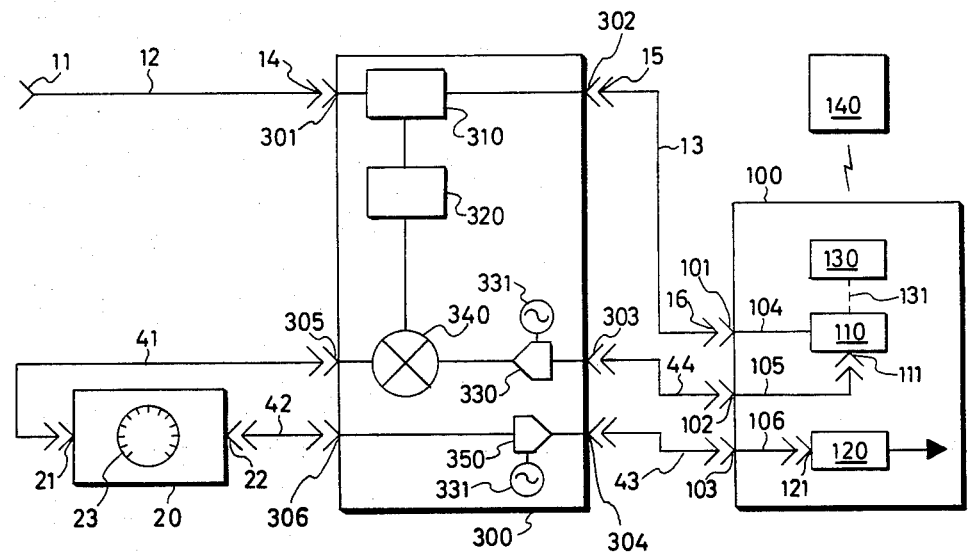
FIG. 2 depicts in block form the interface which embodies the present invention, shown as it is interconnected with the other components of a subscription television reception system.
Figure 3:
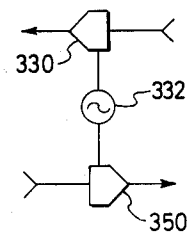
FIG. 3 depicts alternate frequency converter configuration for the interface which embodies the present invention.

The components and operation of the subject invention will be described with reference to FIGS. 2 and 3, referring to FIG. 2, there is shown a modified remote control television receiver 100 which is connected to cable drop 11 and converter/decoder 20 through interface 300. As in the conventional arrangement illustrated in FIG. 1, coaxial cables terminated by releasable connectors are used for purposes of interconnection and the constituent elements are equipped with mating connectors. Of course, if permanent wiring is desired, the coaxial cables may terminate at appropriate connection points of the television receiver 100, converter/decoder 20, and interface 300.

Turning first to the well known elements of television receiver 100, signals received at input connector 101 are fed to tuner 110, by which the viewer selects a channel for viewing. Tuner 110 converts the programming carried by the selected channel to an intermediate frequency (IF) carrier for amplification by IF amplifier 120 and further signal processing by conventional circuitry (not shown) to extract the video and audio components for viewing and listening. IF amplifier 120 amplifies signals lying in a predetermined band about the intermediate frequency. The width of this band is determined by the bandwidth of the audio and video signal. The standardized IF carrier in the United States is 45.75 MHz. However, it will be readily appreciated that other frequencies may be used. Tuner 110 is remotely controlled by remote control transmitter 140 which transmits control signals to remote control receiver 130 located on the chassis of television receiver 100. Remote control may be effected by wire, radio, infra-red, or ultrasound link in a conventional manner. Broken line 131 represents the control function of the remote control receiver 130 by which the desired channel is selected. The particular mode of tuner actuation is of no moment in the present invention and any conventional apparatus may be employed. The IF output of turner 110 is fed to connector 111. In arrangements not utilizing the present invention, this signal is routed through a coaxial cable, directly to the input connector 121 of IF amplifier 120. However, in the present invention, the IF output signal of tuner 110 is processed by interface 300 and the processed signal fed to IF amplifier 120. Again, for ease of interconnection, coaxial cables terminated with releasable connectors are employed; mating connectors are carried by the interface 300 and television receiver 100. Television receiver 100 can be restored to normal operation without interface 300 by connecting IF output connector 102 to IF input connector 103 with a jumper cable (not shown). This restores the direct IF signal path from the output of tuner 110 to the input of IF amplifier 120.

It will be seen that signals received at cable drop 11 are fed to interface 300 through programming input connector 301, where they are then processed by broadband splitter 310. Splitter 310 provides two outputs substantially identical in content to one another and to the input signal while matching impedances thereby preventing undesired reflections and signal losses. Such devices are well known in the art and are used, for example, in residences, to feed television signals from a single antenna to two receivers. One output signal from splitter 310 is fed to a programming output connector and, from that point, to input connector 101 of television receiver 100. Thus, television receiver 100 receives the entire spectrum of signals appearing at cable drop 11. The other output of splitter 310 is fed to band rejection filter 320, which passes all but a predetermined band of frequencies. Filter 320 is deisigned to reject a preselected VHF channel, preferably the same as that used as the otput carrier of converter/decoder 20, that is to say one of channels 2, 3, and 4. For purposes of discussion, the preselected channel will be designated as Channel X. Selection device 23 of converter/decoder 20 will be set to Channel X and need not be changed to select programming.

The IF output of tuner 110 is fed, via IF input connector 303 of inerface 300, to an upconverter 330, where it is converted to Channel X. As is well known in the art, upconverter 330 may comprise, for example a superheterodyne converter having an oscillator or other signal source 331 which provides a substantially constant signal whose frequency is the difference between the IF carrier and the Channel X carrier. The output of upconverter 330 is fed as one input to adder 340 the other input of which is the output of filter 320. The output of adder 340 thus includes information from the entire spectrum received at cable drop 11. This feature is essential to unscrambling, for many subscription cablecasters and broadcasters transmit decoding information, known as executive signals, in the form of tones or otherwise, on carrier frequencies either within the program channel (in-band) or elsewhere in the cablecast or broadcast spectrum (out-of-band). Converter/decoder 20 processes these executive signals in the unscrambling process.

The output of adder 340 is then fed to converter/decoder 20 which, it will be recalled, is set to channel X. Thus, the selected program passed through the tuner, regardless of its cablecast or broadcast frequency, appears at the output of adder 340 on channel X and will be converted by converter/decoder 20 to preset output channel thereof. The output of converter/decoder 20 will be converted back to the IF carrier by downconverter 350, which operates in substantially the same fashion as upconverter 340, the essential difference being that upconverter 340 shifts its input to a higher frequency while downconverter 340 shifts its input to a lower frequency. Once shifted to the IF carrier by downconverter 350, the selected program is fed out connector 304, through coaxial cable 43, into connector 103, through coaxial cable 106, to input connector 121 of IF amplifier 120. Thereafter, amplification and further signal processing proceeds in the usual fashion in conventional circuitry.

In summary then, the incoming subscription cablecast or, broadcast signal is fed to television receiver 100, whose tuner selects the program desired by the viewer and converts the same to an intermediate frequency carrier which, in turn, is shifted up to a selected carrier (channel X) and fed to converter/decoder 20 set to channel X, whose output is converted to the intermediate frequency and returned to television receiver 100. It can readily be seen that in-band executive signals will appear on the IF carrier at the output of tuner 110 along with the program information and flow to the input of converter/decoder 20 in the same fashion. However, out-of-band executive signals will not pass through tuner 110. The other output of signal splitter 310 provides the path for such out-of-band executive signals, through filter 320 and adder 340. Since the program selected by the subscriber will be presented to converter/decoder 20 on channel X, any other signal appearing at cable drop 11 on channel X could interfere with the selected programming. Filter 320 blocks any such interference by rejecting a band of frequencies surrounding the carrier frequency of channel X. Thus, signals carried on channel X are presented to adder 340 exclusively through upconverter 330. The rejection band of filter 320 should be between about 1 and 3 times the bandwidth of a broadcast television channel, which is typically 6 MHz. Of course, if the subscription cablecaster or broadcaster does not use channel X for transmission of programming, filter 320 may be eliminated.

It will be recalled that the program output of converter/decoder 20 is on a preset channel, generally 2, 3 or 4. In order to amplify this signal for further processing in IF amplifier 120, its carrier must be returned to the intermediate frequency of television receiver 100. Downconverter 350 performs this function in essentially the same fashion as upconverter 340 converted the IF output of tuner 110 to channel X. Thus, signal source 351 may be used, the frequency of which is the difference between the preset output carrier of converter/decoder 20 and the IF carrier, as an input to downconverter 350.

It can readily be seen that by choosing the same frequency for the channel X carrier as that preset for the output carrier of converter/decoder 20, the output frequencies of signal sources 331 and 351 will be identical. Thus, a single source can be employed for both upconverter 330 and downconverter 350. This mode is illustrated in FIG. 3, which shows only the converter elements 330 and 350 of interface 300, with common signal source 332. The output of signal source 332 is, of course, a frequency equal to the difference between the preset VHF output carrier of converter/decoder 20 and the IF carrier. By way of illustration, if converter/decoder 20 is designed for output on channel 3 and television receiver 100 employs the standardized domestic IF carrier of 45.75 MHz, signal source 332 will be constructed to provide an output at the carrier frequency for channel 3.

The present invention has been illustrated as a component separate from the subscription television converter/decoder and from the television receiver with releasable coaxial cable interconnection. It will be appreciated, however, that the interface circuitry can be incorporated in the chassis of either the converter/decoder or the television receiver. It will also be appreciated that, with the present invention, converter/decoders may be simplified by elimination of program selection circuitry. Other rearrangements, modifications, or substitutions of parts may be made without departing from the spirit of the invention. The foregoing description is not intended to limit the scope of the invention defined in the appended claims.

What is claimed is:

1. An interface for use with television receiver, which television receiver includes a tuner for selecting one of a plurality of programs each carried on a separate carrier frequency within the television broadcast band and converting the selected program to an intermediate frequency carrier and an intermediate frequency amplifier for amplifying signals within a predetermined frequency band about said intermediate frequency carrier, and converter/decoder means for converting programs carried on a selected carrier frequency to a first predetermined carrier frequency in the television broadcast band and for decoding program information carried thereon, which converter/decoder means has an input port for receiving signals to be converted and decoded and an output port at which the converted and decoded program appears, said interface comprising:

splitter means for receiving a plurality of encoded program signals, each carried on a different carrier frequency within the television broadcast band, and for dividing said encoded program signals into first and second substantially identical components;

a first signal path for transmitting said first program signal component to the input port of said tuner;

a signal adder having two input ports and an output port, the signal at the output port being the sum of the signals at the input ports;

a second signal path for transmitting said second program signal component to a first input port of said signal adder;

an upconverter for converting the program selected by said tuner from the intermediate frequency carrier frequency output of said tuner to second predetermined frequency in the television broadcast band;

a third signal path for transmitting the output of said upconverter to a second input port of said signal adder;

a fourth signal path for transmitting the output of said signal adder for input to said converter/decoder means, a downconverter for converting program signals produced by said converter/decoder means at the output port thereof to said intermediate frequency carrier, and a fifth signal path for transmitting the output of said downconverter for input to said intermediate frequency amplifier.

2. The interface of claim 1 wherein said first predetermined carrier frequency is equal to said second predetermine carrier frequency.

3. The interface of claim 2 wherein said upconverter and said downconverter share a common constant frequency source for frequency conversion.

4. The interface of claim 1 wherein said second signal path includes filter means for rejecting signals in a band about said second predetermined carrier frequency.

5. The interface of claim 4 wherein the rejection bandwidth of said filter means is between 1 and 3 times as wide as the bandwidth of a television channel.

6. A method for selecting and decoding subscription television programs carried on a plurality of carrier frequencies in the television broadcast band comprising:

splitting said programs into first and second substantially identical components;

selecting the desired program from said first component;

converting said desired program from its television broadcast band carrier frequency to an intermediate frequency carrier;

converting the desired program from said intermediate frequency carrier to a first predetermined carrier frequency;

adding said second component to the desired program on said first predetermined carrier frequency to produce a composite signal;

decoding and converting the portion of said composite signal carried on said first predetermined carrier frequency to a second predetermined carrier frequency;

converting the decoded program from said predetermined frequency carrier to said intermediate frequency for amplification and further processing by a television receiver.

7. The method of claim 6 wherein said first and second predetermined carrier frequencies are identical.

8. The method of claim 6 wherein said second component is processed to exclude signals lying in a band about said first predetermined carrier frequency prior to adding the same to the desired program on said first predetermined carrier frequency.

* * * * *

UNITED STATES PATENT AND TRADEMARK OFFICE
CERTIFICATE OF CORRECTION

PATENT NO. : 4,496,986
DATED : Jan. 29, 1985
INVENTOR(S) : EUGENE LUBCHENKO ET AL

It is certified that error appears in the above-identified patent and that said Letters Patent is hereby corrected as shown below:

Column 1 on title page

Change "[73] Assignee: U.S. Philips Corporation, New York, New York" to;

--[73]Assignee: North American Philips Consumer Electronics Corp., Knoxville, TN.--.

Signed and Sealed this

First Day of October 1985

[SEAL]

Attest:

DONALD J. QUIGG

Attesting Officer

Commissioner of Patents and
Trademarks—Designate